Dec. 7, 1943.  H. DREYFUS  2,335,922
MANUFACTURE OF ARTIFICIAL TEXTILE MATERIALS AND THE LIKE
Filed March 6, 1941
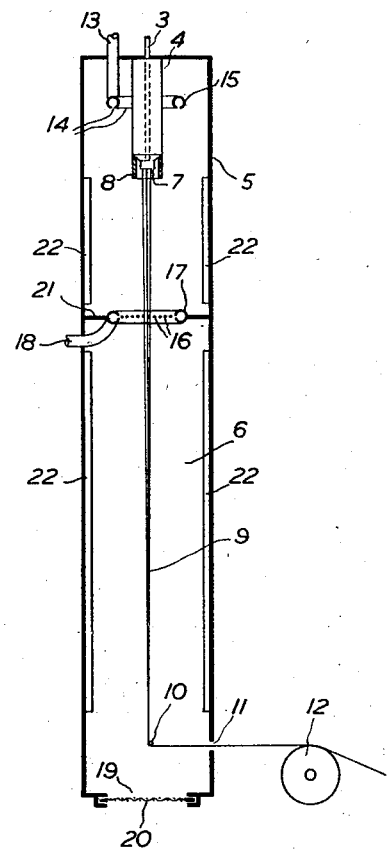
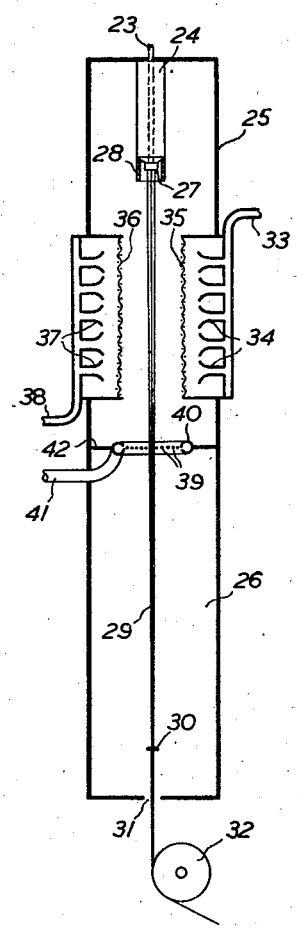
Inventor
HENRY DREYFUS
by.
Seltzer and Bluffenson
Attorneys Patented Dec. 7, 1943

2,335,922

UNITED STATES PATENT OFFICE 2,335,922

MANUFACTURE OF ARTIFICIAL TEXTILE MATERIALS AND THE LIKE

Henry Dreyfus, London, England, assignor to Celanese Corporation of America, a corporation of Delaware Application March 6, 1941, Serial No. 382,007
In Great Britain April 17, 1940

6 Claims. (Cl. 18—54)

This invention relates to the manufacture of artificial textile materials and the like and particularly to materials having a basis of synthetic thermoplastic materials of high molecular weight.

It has recently been found that synthetic film- or fibre-forming substances may be produced by the union of the residues of the molecules of one or more reagents, each containing two reactive groups in the molecule, by the condensation of a reactive group of one molecule with a reactive group of another molecule, water, hydrochloric acid or a similar substance being eliminated during the reaction. Synthetic substances or polymers of this nature may be formed, for example, by condensing diamines with dicarboxylic acids, with dihalogen derivatives of hydrocarbons, with disulphonic acids or with glycols, amino-carboxylic acids, amino-sulphonic acids, or amino-halides with themselves or with each other, diacid amides with diacids, and so forth. By a suitable choice of reagents, it is possible to produce substances with long chain molecules of high molecular weight which can be converted by suitable methods into fibres or films. Preferably reagents are chosen which have no substantial tendency to condense with formation of cyclic compounds. This may be achieved by selecting the reagents in such a way that the "unit length" of the resulting polymer consists of more than 6 atoms in a chain, and preferably more than 7 atoms. In the case of condensing diamines with dicarboxylic acids, for example, the unit length is arrived at by adding the number of atoms joining the two nitrogen atoms in the diames plus 2, to the number of atoms joining the carboxylic groups in the dicarboxylic acids plus 2.

The film- or fibre-forming polymers resulting from such condensations may be formed into textile filaments, bristles, ribbons, films and the like, and in order to do so it is frequently convenient to work at rather high temperatures, e. g. of the order of 200–300° C. For example, shaped articles may be formed from polymers or solutions of polymers in appropriate solvents by shaping them in molten condition, but often the polymers or solutions only become sufficiently fluid for extrusion or other shaping operation at temperatures of 200–300° C. At such temperatures however, and even at lower temperatures than these, exposure of the polymer to oxygen-containing gases is liable to lead to discoloration of the materials. For this reason, it has been proposed to employ nitrogen or some other inert gaseous medium as the setting atmosphere when working according to the dry-spinning process.

It is to be understood that, for the purpose of the present specification, the term "dry-spinning process" covers a melt-spinning process in which setting takes place in a gaseous or vaporous atmosphere.

Materials spun according to the dry-spinning process in which the extruded materials are first received in an enclosed chamber, such as is necessary when operating upon molten polymers of the type described above, may be collected in either of two ways, viz., inside or outside the spinning chamber. If the former method is adopted, it is necessary to open the chamber at relatively frequent intervals to attend to the winding devices, while if the latter method is employed, an opening must be provided for the withdrawal of the products and this opening renders it difficult, if not impossible, to avoid entry of air which may contact with and damage the highly heated materials. Of these two methods, the second is by far the preferable, provided that some way of meeting the difficulty mentioned can be devised.

I have now found that the dry-spinning operation can be successfully applied to molten polymers or to molten compositions containing the polymers, without the necessity of preventing entry of air into the chamber through the opening provided for the withdrawal of the products, by drawing off the atmosphere of the chamber at one or more regions situated between the spinning orifices and the said opening. In this way there is formed in the chamber a zone which is substantially filled with inert medium and in which the filaments or other materials are received on extrusion, and another zone which is substantially filled with air and from which the filaments are withdrawn from the chamber. The extent of these two zones is determined so that sufficient cooling of the extruded materials takes place in the inert medium to allow for their contact with air without risk of damage to the materials.

According to the invention, therefore, artificial textile materials and the like are produced by extruding fluid material comprising a synthetic thermoplastic highly polymeric fibre-forming substance into an inert gaseous or vaporous medium, cooling the extruded material in the said medium to a temperature at which air has substantially no damaging effect on the material, and thereafter introducing the material into air and completing the setting thereof. The invention also includes apparatus by which this process may be carried out.

The nature of the invention will be more clearly understood by reference to particular apparatus for use in spinning from a mass of molten polymer. Figures 1 and 2 of the accompanying drawing show, by way of example, two forms of apparatus according to the invention.

In Figure 1, a narrow tube 3 surrounded by an electric heating element 4 is mounted in the upper end of a cylindrical casing 5 enclosing a chamber 6, and feeds molten material to a spinning jet 7 which is closely surrounded by an electric heating element 8 to maintain the face of the jet and the closely adjacent atmosphere at a desired elevated temperature. Filaments 9, extruded from the jet 7, pass down the chamber 6 to a guide bar 10 and thence through a small opening 11 to a feed roller 12 and a suitable winding, twisting and winding, or other take-up device, not shown. The upper part of the chamber 6 is fed with an inert gas or vapour from a lead 13, through holes 14 in an annular pipe 15. This inert gas or vapour is drawn off from the chamber through holes 16 in an annular pipe 17, to a suction pipe 18. The annular pipe 17 is situated at such a distance from the jet 7 that the filaments 9 before they reach the level of the pipe have cooled sufficiently to be substantially undamaged by contact with air. The suction applied through the holes 16 also draws air into the lower part of the chamber 6, through the circular hole 19 covered with fine wire gauze 20 in the base of the casing 5. A small amount of air also enters through the opening 11. A diaphragm 21, mounted between the annular pipe 17 and the casing 5, prevents the passage of gases or vapours through this space, and electric heating elements 22 on the inside of the casing 5 can be employed for heating the atmosphere in the chamber 6.

In Figure 2, a narrow tube 23 surrounded by an electric heating element 24 is mounted in the upper end of a rectangular casing 25 enclosing a chamber 26, and feeds molten material to a spinning jet 27 which is closely surrounded by an electric heating element 28 to maintain the face of the jet and the closely adjacent atmosphere at a desired elevated temperature. Filaments 29, extruded from the jet 27, pass down the chamber 26 to a guide 30 and thence through an orifice 31 in the base of the casing 25, to a feed roller 32 and a suitable winding, twisting and winding, or other take-up device, not shown. The upper part of the chamber 26 is fed with an inert gas or vapour passing from a lead 33 and orifices 34 through fine wire gauze 35 into the chamber and out through fine wire gauze 36 and orifices 37 to the suction pipe 38. Some part of the inert gas or vapour is drawn off from the chamber through holes 39 in an annular pipe 40 to a suction pipe 41, and the same means also draws air in through the orifice 31 and up through the lower part of the chamber 26. The orifice 31 may be adjustable in diameter, e. g. it may be formed by an iris diaphragm, so that drag exerted on the filaments by the inflowing air may be controlled. A diaphragm 42 mounted between the annular pipe 40 and the casing 25 prevents the passage of gases or vapours through this space.

It will be understood that various particular features illustrated in only one of the figures may be applied to the apparatus shown in the other figure with appropriate modification, and that other modifications may also be made. For example, inlets and outlets for inert gas or vapour similar to those shown in Fig. 2 may be employed in conjunction with cylindrical or other casings as well as with rectangular casings, and an inlet pipe of the type illustrated at 15 in Figure 1 may be employed in casings which are not cylindrical. Electric heating elements as at 22 may also be included in the apparatus of Figure 2. In place of electric heating elements, coils may be provided so that the spinning chambers may be either heated or cooled by appropriate fluids according to the desired speed of setting of the extruded materials. Although at 20, 35 and 36 only a single wire gauze sheet is shown, it may be desirable, particularly at 20 and 35, in order to produce better parallelisation of the flow of gases or vapours, to employ a pair of sheets of gauze spaced apart about ¼"–½" or even more. One or two sheets of gauze may also be provided just below the inlet for inert gas or vapour in Fig. 1 so that the flow of this medium past the jet may be substantially parallel.

The drawing shows only one spinning jet in a particular casing, but there may be a number of jets in a casing, arranged, for example, in line. The necessary modification of the details of the apparatus will be obvious if such a number of jets are to be employed.

The actual extent of the zone of inert medium substantially free from air will naturally depend upon a number of factors, including the nature of the polymer, particularly as regards its specific heat and the maximum temperature at which it is stable to air, the temperature of extrusion, and the cross-section of the materials. It may extend, for example, for one to two or three feet or more from the face of the spinneret.

The inert medium is advantageously a vapour which can readily be recovered from admixture with the air with which it is drawn off from the chamber. It is generally undesirable that such a vapour should condense in the chamber itself and it should therefore be the vapour of a liquid of relatively low boiling point. Suitable agents are, for example, ethyl ether, dioxane, ethyl chloride and carbon tetrachloride. Steam may also be employed, with particular advantage. Other media which may be employed are inert gases such as, for example, nitrogen, carbon dioxide, preferably well dried, and hydrogen. If desired, the inert gases or vapours may be preheated to a temperature substantially above atmospheric temperature or above their condensation temperature, before being introduced into the chamber, but this is not generally necessary, though it is advantageous to introduce a separate supply of preheated medium into the immediate neighbourhood of the spinneret at a temperature approaching that of the molten material to be extruded.

The present invention is of the greatest importance in connection with the extrusion of molten polymers or molten compositions containing the polymers substantially free from volatile agents so that the operation of setting consists in simply cooling the molten materials below their point of fusion. However, other compositions may be employed, especially compositions containing volatile solvents or other softening agents for the polymers such as, for example, phenols, e. g. phenol, cresol and xylenol. When shaping such compositions according to the process of the present invention, the volatile softening agent may be evaporated, at least in part, from the extruded materials during passage through the inert medium so that setting takes place in this medium by the combined effect of cooling and removal of solvent. Further evaporation of volatile agent may, if desired, be effected by means of the air present in the lower part of the chamber. Alternatively, residual softening agent may be removed by washing in a suitable bath of non-solvent for the polymer. Instead of evaporating any substantial amount of volatile softening agent from the extruded materials, the whole may be removed by washing the materials after they have been withdrawn from the spinning chamber.

For the purposes of the present invention, the jet may be supplied with material from any suitable source of molten material. For example, the jet may be fed with molten material which has been brought to a uniform degree of fluidity by feeding through a narrow tube, as described in my U. S. application S. No. 375,762, filed January 24, 1941, under pressure applied by means of pumps of which at least the glands are immersed in a heated fluid medium which is a non-solvent for the material as described in my U. S. application S. No. 375,761, filed January 24, 1941.

Shaped materials according to the invention may have the form of filaments, yarns, films, foils or other shaped articles formed by extrusion or like methods, and the filamentary products may be converted, if desired, into staple fibre, for example by cutting methods. If desired, various effects may be produced in the articles by modifying the composition of the fused material to be extruded. Such effect materials may be, for example, high-boiling softening agents, which are preferably insoluble in the inert non-solvent medium, pigments, dyes and the like. Such effect materials may be introduced into the reaction mixture before polymerisation takes place, or during polymerisation, or after completion of the polymerisation. In addition to such effect materials, the characteristics of the products may be modified by incorporating in the fused materials, one or more other thermoplastic substances, for example organic derivatives of cellulose, e. g. cellulose acetate, cellulose aceto-propionate, cellulose acetobutyrate, cellulose stearate or cellulose acetostearate. Such additional thermoplastic materials may, in particular, modify the dye affinity of the products as well as the general physical characteristics thereof.

Having described my invention, what I desire to secure by Letters Patent is:

1. Process for the production of artificial textile materials and the like, which comprises extruding a fluid material comprising a synthetic thermoplastic highly polymeric fibre forming substance at a temperature at which air has a damaging effect on the said substance into a chamber of which the zone into which the material is extruded is filled with an inert gaseous or vaporous medium which is fed thereto and has a cooling effect on said material, passing the extruded material, after it is cooled to a temperature at which air has substantially no damaging effect on the substance, from the said zone to a zone which is filled with air and to which air is admitted, withdrawing a mixture of said inert medium and air from the chamber at the common boundary of the two zones, and withdrawing the material from the said chamber.

2. Process for the production of artificial textile materials and the like, which comprises extruding a fluid material comprising a synthetic thermoplastic highly polymeric fibre forming substance at a temperature at which air has a damaging effect on the said substance into a chamber of which the zone into which the material is extruded is filled with an inert gaseous or vaporous medium which is fed thereto, a portion of said medium immediately surrounding the extruded material during the early stage of its travel in said medium being heated to substantially the same temperature as that of the fluid material at the time of extrusion and the remainder of said medium being at a temperature which has a cooling effect on the extruded material, passing the extruded material, after it is cooled to a temperature at which air has substantially no damaging effect on the substance, from the said zone to a zone which is filled with air and to which air is admitted, withdrawing a mixture of said inert medium and air from the chamber at the common boundary of the two zones, and withdrawing the material from the said chamber.

3. Process for the production of artificial textile materials and the like, which comprises extruding a fluid material comprising a synthetic thermoplastic highly polymeric fibre forming substance at a temperature at which air has a damaging effect on the said substance into a chamber of which the zone into which the material is extruded is filled with a medium comprising the vapor of a liquid of relatively low boiling point which can readily be recovered from admixture with air, which medium is fed to said zone and has a cooling effect on said material, passing the extruded material, after it is cooled to a temperature at which air has substantially no damaging effect on the substance, from the said zone to a zone which is filled with air and to which air is admitted, withdrawing a mixture of said inert medium and air from the chamber at the common boundary of the two zones, and withdrawing the material from the said chamber.

4. Process for the production of artificial textile materials and the like, which comprises extruding a fluid material comprising a synthetic thermoplastic highly polymeric fibre forming substance at a temperature at which air has a damaging effect on the said substance into a chamber of which the zone into which the material is extruded is filled with a medium comprising the vapor of a liquid of relatively low boiling point which can readily be recovered from admixture with air, which medium is fed to said zone, a portion of said medium immediately surrounding the extruded material during the early stage of its travel in said medium being heated to substantially the same temperature as that of the fluid material at the time of extrusion and the remainder of said medium being at a temperature which has a cooling effect on the extruded material, passing the extruded material, after it is cooled to a temperature at which air has substantially no damaging effect on the substance, from the said zone to a zone which is filled with air and to which air is admitted, withdrawing a mixture of said inert medium and air from the chamber at the common boundary of the two zones, and withdrawing the material from the said chamber.

5. Process for the production of artificial textile materials and the like, which comprises extruding a fluid material comprising a synthetic thermoplastic highly polymeric fibre forming substance at a temperature at which air has a damaging effect on the said substance into a chamber of which the zone into which the material is extruded is filled with steam which is fed thereto and has a cooling effect on said material, passing the extruded material, after it is cooled to a temperature at which air has substantially no damaging effect on the substance, from the said zone to a zone which is filled with air and to which air is admitted, withdrawing a mixture of steam and air from the chamber at the common boundary of the two zones, and withdrawing the material from the said chamber.

6. Process for the production of artificial textile materials and the like, which comprises extruding a fluid material comprising a synthetic thermoplastic highly polymeric fibre forming substance at a temperature at which air has a damaging effect on the said substance into a chamber of which the zone into which the material is extruded is filled with steam which is fed thereto, a portion of said steam immediately surrounding the extruded material during the early stage of its travel in said steam being heated to substantially the same temperature as that of the fluid material at the time of extrusion and the remainder of said steam being at a temperature which has a cooling effect on the extruded material, passing the extruded material, after it is cooled to a temperature at which air has substantially no damaging effect on the substance, from the said zone to a zone which is filled with air and to which air is admitted, withdrawing a mixture of steam and air from the chamber at the common boundary of the two zones, and withdrawing the material from the said chamber.

HENRY DREYFUS.